US009098462B1

(12) United States Patent
McNicholl et al.

(10) Patent No.: US 9,098,462 B1
(45) Date of Patent: Aug. 4, 2015

(54) COMMUNICATIONS VIA SHARED MEMORY

(75) Inventors: Michael J. McNicholl, Seattle, WA (US); David Joseph Guichard, Seattle, WA (US); Yong-Long Ling, Bellevue, WA (US); George Wu, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 665 days.

(21) Appl. No.: 12/881,392

(22) Filed: Sep. 14, 2010

(51) Int. Cl.
*G06F 12/00* (2006.01)
*G06F 13/00* (2006.01)
*G06F 13/28* (2006.01)
*G06F 13/16* (2006.01)
*G06F 12/02* (2006.01)

(52) U.S. Cl.
CPC ........ *G06F 13/1631* (2013.01); *G06F 12/0215* (2013.01)

(58) Field of Classification Search
CPC .......................... G06F 12/1458; G06F 12/0284
USPC .......................................................... 711/147
See application file for complete search history.

(56) References Cited

U.S. PATENT DOCUMENTS

| | | | |
|---|---|---|---|
| 4,175,287 A | | 11/1979 | Fuhrman |
| 4,574,350 A | * | 3/1986 | Starr .............................. 710/200 |
| 5,375,208 A | * | 12/1994 | Pitot ............................. 711/156 |
| 5,404,483 A | * | 4/1995 | Stamm et al. ................. 711/144 |
| 5,537,552 A | * | 7/1996 | Ogasawara et al. ............. 710/57 |
| 5,657,468 A | | 8/1997 | Stallmo et al. |
| 5,706,510 A | | 1/1998 | Burgoon |
| 5,796,413 A | * | 8/1998 | Shipp et al. .................... 345/522 |
| 5,832,297 A | * | 11/1998 | Ramagopal et al. .............. 710/5 |
| 5,884,055 A | * | 3/1999 | Tung et al. ..................... 710/307 |
| 5,987,506 A | | 11/1999 | Carter et al. |
| 6,044,225 A | * | 3/2000 | Spencer et al. ................. 710/52 |
| 6,243,816 B1 | | 6/2001 | Fang et al. |
| 6,317,427 B1 | * | 11/2001 | Augusta et al. ............... 370/357 |
| 6,360,331 B2 | | 3/2002 | Vert et al. |
| 6,601,187 B1 | | 7/2003 | Sicola et al. |
| 6,687,832 B1 | | 2/2004 | Harada et al. |
| 6,742,094 B2 | | 5/2004 | Igari |
| 6,772,031 B1 | | 8/2004 | Strand |

(Continued)

OTHER PUBLICATIONS

Younis et al., Integrating Redundancy Management and Real-time Services for Ultra Reliable Control Systems, Proceedings of the International Conference on Parallel and Distributed Processing Techniques and Applications (PDPTA'2001), Las Vegas, Nevada, Jun. 2001.

(Continued)

*Primary Examiner* — Sheng-Jen Tsai
(74) *Attorney, Agent, or Firm* — Toler Law Group, PC

(57) ABSTRACT

A first processing core selects a first memory address of a first memory area based on a last written buffer that identifies a last written memory address. The first memory area is a portion of a shared memory, and the first processing core has sole write access to the first memory area among a plurality of processing cores that use the shared memory. Data is written to the first memory address of the first memory area. After writing the data to the first memory address, the last written buffer is updated to designate the first memory address as the last written memory address of the first memory area. A second processing core of the plurality of processing cores is operable to access the data by accessing the last written buffer and determining, based on the last written buffer, that the data is stored at the first memory address.

20 Claims, 8 Drawing Sheets

(56) References Cited

U.S. PATENT DOCUMENTS

| | | |
|---|---|---|
| 6,937,988 B1* | 8/2005 | Hemkumar et al. .......... 704/500 |
| 7,020,697 B1 | 3/2006 | Goodman et al. |
| 7,139,809 B2 | 11/2006 | Husain et al. |
| 7,149,660 B2 | 12/2006 | Kuehn et al. |
| 7,151,438 B1 | 12/2006 | Hall et al. |
| 7,308,532 B1 | 12/2007 | Wood et al. |
| 7,437,426 B2 | 10/2008 | Joshi et al. |
| 7,457,880 B1 | 11/2008 | Kim |
| 7,496,646 B2 | 2/2009 | Casper et al. |
| 7,562,128 B1 | 7/2009 | Caris et al. |
| 7,631,179 B2 | 12/2009 | Kuehn et al. |
| 7,701,924 B1 | 4/2010 | Bell et al. |
| 7,734,878 B1 | 6/2010 | Sharma et al. |
| 7,734,951 B1 | 6/2010 | Balasubramanian et al. |
| 7,739,541 B1 | 6/2010 | Rao et al. |
| 7,739,602 B2 | 6/2010 | Feng et al. |
| 7,739,687 B2 | 6/2010 | Newport |
| 7,788,522 B1 | 8/2010 | Abdelaziz et al. |
| 7,797,357 B1 | 9/2010 | Nagaraj et al. |
| 7,840,995 B2 | 11/2010 | Curran et al. |
| 7,966,370 B1 | 6/2011 | Pegg et al. |
| 8,095,670 B2 | 1/2012 | Brown et al. |
| 8,171,101 B2 | 5/2012 | Gladwin et al. |
| 2001/0008019 A1 | 7/2001 | Vert et al. |
| 2002/0038451 A1 | 3/2002 | Tanner et al. |
| 2002/0075293 A1 | 6/2002 | Charisius et al. |
| 2002/0100024 A1* | 7/2002 | Hunter et al. ................. 717/129 |
| 2002/0103783 A1 | 8/2002 | Muhlestein |
| 2002/0104039 A1 | 8/2002 | DeRolf et al. |
| 2003/0065760 A1 | 4/2003 | Casper et al. |
| 2003/0120751 A1 | 6/2003 | Husain et al. |
| 2003/0154406 A1 | 8/2003 | Honarvar et al. |
| 2004/0010544 A1 | 1/2004 | Slater et al. |
| 2004/0025008 A1 | 2/2004 | Kuehn et al. |
| 2004/0123152 A1 | 6/2004 | Le Saint |
| 2005/0086188 A1 | 4/2005 | Hillis et al. |
| 2005/0251631 A1* | 11/2005 | Rowlands et al. ............ 711/145 |
| 2006/0036816 A1* | 2/2006 | McMahan et al. ............ 711/153 |
| 2006/0064554 A1 | 3/2006 | Fridella et al. |
| 2006/0085750 A1 | 4/2006 | Easton, Jr. et al. |
| 2006/0143606 A1 | 6/2006 | Smith et al. |
| 2006/0174319 A1 | 8/2006 | Kraemer et al. |
| 2006/0230118 A1 | 10/2006 | Jwo |
| 2007/0028300 A1 | 2/2007 | Bishop et al. |
| 2007/0055683 A1 | 3/2007 | Grotjohn et al. |
| 2007/0073855 A1 | 3/2007 | Joshi et al. |
| 2007/0094416 A1 | 4/2007 | Goldstein et al. |
| 2007/0192706 A1 | 8/2007 | Bruce et al. |
| 2007/0240102 A1 | 10/2007 | Bello et al. |
| 2007/0244937 A1 | 10/2007 | Flynn, Jr. et al. |
| 2007/0283112 A1 | 12/2007 | Fujibayashi |
| 2008/0120380 A1 | 5/2008 | Boyd et al. |
| 2008/0183931 A1* | 7/2008 | Verm et al. .................... 710/260 |
| 2009/0013085 A1 | 1/2009 | Liberman Ben-Ami et al. |
| 2009/0070456 A1 | 3/2009 | Brown et al. |
| 2009/0119767 A1 | 5/2009 | Curran et al. |
| 2009/0143128 A1 | 6/2009 | Cautley et al. |
| 2009/0182750 A1 | 7/2009 | Keyes et al. |
| 2009/0193207 A1 | 7/2009 | Ogata et al. |
| 2009/0270077 A1 | 10/2009 | Fiorini et al. |
| 2009/0271498 A1 | 10/2009 | Cable |
| 2010/0005199 A1* | 1/2010 | Gadgil ............................ 710/22 |
| 2010/0011007 A1 | 1/2010 | Bettger et al. |
| 2012/0185652 A1 | 7/2012 | Peters et al. |
| 2012/0185653 A1 | 7/2012 | Peters et al. |
| 2012/0185725 A1 | 7/2012 | Peters et al. |
| 2012/0191920 A1* | 7/2012 | Aho et al. ..................... 711/147 |

OTHER PUBLICATIONS

Kuehn et al., U.S. Appl. No. 12/750,582 entitled "Computer Architectures Using Shared Storage", Mar. 30, 2010.

Peters et al., U.S. Appl. No. 12/750,608 entitled "Computer Architectures Using Shared Storage", Mar. 30, 2010.

Bettger et al., U.S. Appl. No. 12/750,616 entitled "Computer Architectures Using Shared Storage", Mar. 30, 2010.

* cited by examiner

COMMUNICATIONS VIA SHARED MEMORY

FIELD OF THE DISCLOSURE

The present disclosure is generally related to communications via shared memory.

BACKGROUND

In certain systems, multiple processors or partitions may be used to accomplish various functions. Using the multiple processor or partitions as shared processing resources in this manner can reduce cost of a system. For example, a first process can use a processor when a second process is not using the processor. Thus, only one processor is needed to accomplish multiple functions.

However, in certain applications sharing processing resources can be problematic. To illustrate, in the example above, if the first process hangs (e.g., stops to wait for data, has an error, etc.), the second process may be locked out of the processor. If the second process is a safety system, this situation may be unacceptable. Standards and design principles have been established for some systems to provide protection against these problems. For example, in Integrated Modular Avionics (IMA) architectures that follow the Avionics Application Standard Software Interface (ARINC) 653 standard, one processor or partition is not allowed to block or wait for another processor or partition. Thus, certain methodologies for communication among processors or partitions may not be acceptable. For example, communication methodologies that use spin locks, semaphores, set and test instructions, or other similar methods may be unacceptable since they may cause one partition to block or wait until a resource is free.

SUMMARY

Embodiments disclosed enable communications via shared memory. For example, a plurality of processor, processor cores, partitions or other logical or physical processing systems may communicate using shared memory. The communications via the shared memory is non-locking, enabling robust spatial and temporal partitioning of the processing systems and shared memory. Particular embodiments disclosed may enable sharing of processing resources in a manner that complies with the ARINC 653 standard.

In a particular embodiment, a system includes at least two processing cores and at least one non-transitory computer-readable storage medium accessible to the at least two processing cores. The at least one non-transitory computer-readable medium includes instructions that are executable by a first processing core of the at least two processing cores. The instructions are executable to cause the first processing core to access a last written buffer to identify a last written memory address of a first memory area in response to determining that new data is available at the first processing core. The first processing core has sole write access among the at least two processing cores to the first memory area. The instructions are further executable to cause the first processing core to select a first memory address based on the last written buffer and to write the new data to a memory location identified by the first memory address. The instructions are executable to cause the first processing core to update the last written buffer to identify the first memory address as the last written memory address. The instructions are executable by a second processing core of the at least two processing cores to cause the second processing core to access the last written buffer of the first memory area and to determine, based on the last written buffer, that the new data is stored at the memory location identified by the first memory address. The instructions are executable to cause the second processing core to read the new data from the memory location identified by the first memory address.

In a particular embodiment, a computer-implemented method includes selecting, by a first processing core, a first memory address of a first memory area based on a last written buffer that identifies a last written memory address of the first memory area. The first memory area is a portion of a shared memory, and the first processing core has sole write access to the first memory area among a plurality of processing cores that use the shared memory. The method further includes writing data to a the first memory address of the first memory area, and after writing the data to the first memory address, updating the last written buffer to designate the first memory address as the last written memory address of the first memory area. A second processing core of the plurality of processing cores is operable to access the data by accessing the last written buffer and determining, based on the last written buffer, that the data is stored at a location designated by the first memory address.

In a particular embodiment, a system includes a shared memory and a memory management unit that controls read access and write access of a plurality of processing cores to the shared memory. The system also includes a first processing core of the plurality of processing cores. The memory management unit enables write access to a first memory area of the shared memory only to the first processing core. When new data is to be stored by the first processing core, the first processing core selects a first memory address of the first memory area based on a last written buffer that identifies a last written memory address of the first memory area. The first processing core also stores the new data at a memory location identified by the first memory address of the first memory area, and updates the last written buffer to designate the first memory address as the last written memory address of the first memory area. The system also includes a second processing core of the plurality of processing cores. The memory management unit enables read access to the first memory area by the second processing core. The second processing core is operable to access the last written buffer of the first memory area and to determine, based on the last written buffer, that the new data is stored at the memory location identified by the first memory address. The second processing core is also operable to read the new data from the memory location identified by the first memory address.

The features, functions, and advantages that have been described can be achieved independently in various embodiments or may be combined in yet other embodiments, further details of which are disclosed with reference to the following description and drawings.

DETAILED DESCRIPTION

Figure 1:
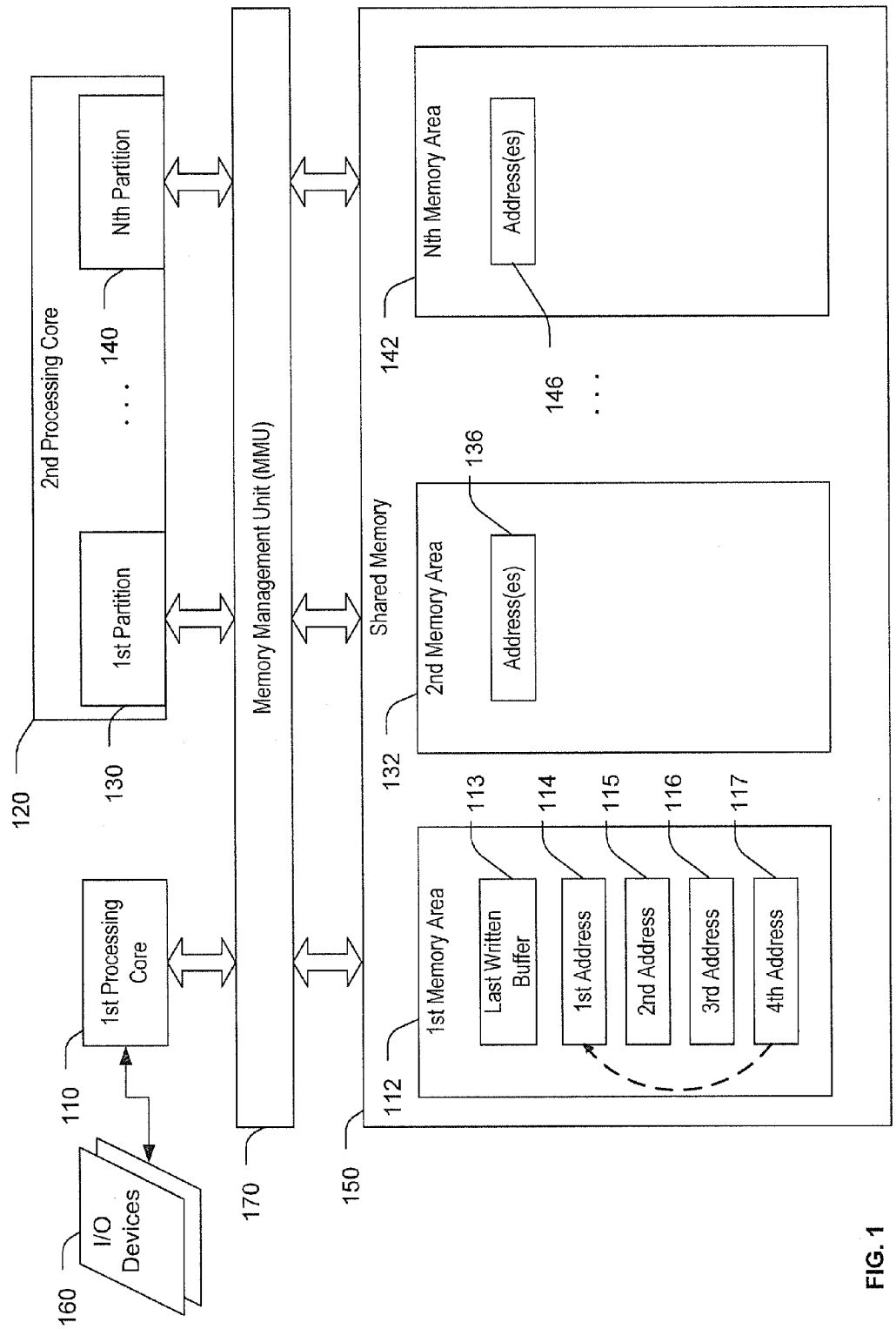
FIG. 1 is a block diagram of a first particular embodiment of a system that supports communication using shared memory.

Embodiments disclosed enable communications via shared memory. For example, a plurality of processors, processor cores, partitions or other logical or physical processing systems may communicate using the shared memory. The communications via the shared memory are non-locking, enabling robust spatial and temporal partitioning of the processing systems and the shared memory. Particular embodiments enable sharing of processing resources in a manner that complies with the ARINC 653 standard. Accordingly, such systems may be useful for integrated modular avionics architectures for use in aircraft. Additionally, particular embodiments disclosed require no overhead or operating system services to enable processors to share dedicated memory space for their data structures.

In certain systems, input and output functions (e.g., data transfer) may detract from overall system performance. For example, a significant amount of processing resources may be used by such input and output functions, which can reduce the amount of processing power that is available for use by system applications. Some system designers may attempt to offset this reduction in the amount of available processing power by increasing a number of processors available, which can increase cost and weight of the system.

In a particular embodiment, the overhead due to the input and output functions may be mitigated by using an input/output (IO) processor that is separate from a general purpose processor or application processor. Input data transfer functions, output data transfer functions or both may be offloaded from one or more application processors to the IO processor. In a particular embodiment, the IO processor and the one or more application processors may comply with the robust partitioning requirements of the ARINC 653 standard and Integrated Modular Avionics (IMA) architecture requirements by communicating through shared memory.

The ARINC 653 standard includes support for two modes of messaging: sampling port messaging and queuing port messaging. In a sampling port mode, successive messages carry updated data and only the most recently updated data is useful. Thus, outdated sampling port messages may be overwritten by subsequent sampling port messages. The sampling port mode may be used, for example, to communicate sensor data, where the sensor data is used by an application to make decisions based on current conditions. In this situation, past sensor data may not be relevant and, thus, may be overwritten.

A queuing port mode may be used when no data is to be lost or overwritten. Thus, queuing port messages may be stored in a queue. Under normal circumstances, no queuing port message is overwritten until it has been read.

Embodiments disclosed include methods and systems to support sampling port messaging and queuing port messaging in a computing system. In particular, the sampling port messaging and queuing port messaging may be supported in an IMA architecture that complies with the robust partitioning of the ARINC 653 standard. For ease of explanation herein, the terms "processor," "processing core," "core," and "partition" are considered interchangeable except where indicated otherwise in the particular context. The robust partitioning systems described may provide for interaction between separate processors, separate cores of a single processor, separate cores of separate processors, separate partitions or threads running on a processor or multiple processors, or any combination thereof. Generally, the term "processing core" is used generically to refer to any of these arrangements.

Since input and output functions may use a significant portion of available processing capacity of an application processor, separating input and output functions from the application processor may provide substantial benefits. Accordingly, in a particular embodiment, a first processing core may be used for input and output functions and a second processing core may be used to implement a particular application. However, separating input and output functions from application processing is not the only use that may benefit from the embodiments described herein. For example, multiple application processors may interact with one another using embodiments described herein.

FIG. 1 is a block diagram of a first particular embodiment of a system that supports communication using shared memory. The system includes at least two processing cores, including a first processing core 110 and a second processing core 120. As previously explained, the term "processing core" is used to generally refer to one or more processors, one or more cores within a single processor, one or more logical partitions or threads operating on a single processor or multiple processors, or any combination thereof. Accordingly, the second processor core 120 is shown to have a first partition 130 and one or more additional partitions, including an nth partition 140.

The system also includes a shared memory 150. The shared memory 150 may include at least one non-transitory computer-readable storage medium that is accessible by the at least two processing cores 110 and 120. The shared memory 150 may include partitions or memory areas that are each associated with one of the processing cores 110, 120, one of the partitions 130, 140, or a combination of processing cores and partitions. For example, a first memory area 112 may be associated with the first processing core 110, a second memory area 132 may be associated with a first partition 130 of the second processing core 120, and an nth memory area 142 may be associated with the nth partition 140 of the second processing core 120. A memory management unit 170 may control access to the shared memory 150 by the processing cores 110, 120 to allocate and control access to the memory areas 112, 132, and 142. For example, the memory management unit 170 may control read and write access to the memory areas within the shared memory 150. To illustrate, the first processing core 110 may be provided read and write access to the first memory area 112, the first partition 130 may be provided read and write access to the second memory area 132, and the nth partition 140 may be provided read and write access to the nth memory area 142. A memory area 112, 132, 142 associated with a particular processing core 110, 120 or partition 130, 140 may be readable (but not writable) by other partitions or processing cores. To illustrate, the first memory area 112, which is writable by the first processing core 110, may be readable by the first partition 130 and the nth partition 140. However, the first partition 130 and the nth partition 140 may not have access to write to the first memory area 112. Likewise, the first partition 130 may have write access to the second memory area 132, and the first processing core 110 and the nth partition 140 may have only read access to the second memory area 132. Further, the nth partition 140 may have write access and read access to the nth memory area 142 and the first processing core 110 and first partition 130 may have only read access to the nth memory area 142.

The second processing core 120 may be an application processing core that includes multiple logical partitions 130, 140 to perform various application functions. The first processing core 110 may also be an application processing core, or the first processing core 110 may be an input/output (IO) processing core that is provided to relieve the second processing core 120 of IO functions. For example, the first processing core 110 may interact with one or more IO devices 160. To illustrate, the first processing core 110 may send output data of the second processing core 120 to the IO devices 160. Similarly, the first processing core 110 may receive input information from the IO devices 160 and may provide the input information to the second processing core 120.

In a particular embodiment, at least one of the memory areas of the shared memory 150 may include a data structure that facilitates communication between the partitions 130, 140 and the processing cores 110, 120 via the shared memory 150. For example, the first memory area 112 may have a data structure that includes a last written buffer 113 and multiple memory addresses including, a first address 114, a second address 115, a third address 116, and a fourth address 117. The data structure of the first memory area 112 may include more or fewer memory addresses 114-117 depending on the particular configuration. Additionally, the data structure may include other features depending on the particular implementation. For example, the particular embodiment illustrated in FIG. 1 shows a configuration that may support sampling port messaging, and additional data may be stored in the first memory area 112 to support queuing port messaging.

In a sampling port mode, older data may be overwritten as newer data becomes available. Thus, the first memory area 112 may include a relatively small number of memory addresses 114-117 since only a most recent update of the sampling port data is retained. Theoretically, only one memory address may be needed in the first memory area 150 to support sampling port messaging; however, to avoid conflicts between multiple applications that may use the sampling port data and that may read the sampling port data at different rates, more than one memory address may be provided. Accordingly, the first memory area 112 is illustrated in FIG. 1 as having four memory addresses 114-117; however, more or fewer memory addresses may be present in various embodiments.

Data stored in the first memory area 150 may be used by applications executing in the first partition 130 and the nth partition 140. For example, the first partition 130 may include an application that sends output to the IO devices 160 via the first memory area 112. As another example, the nth partition 140 may use data read from the first memory area 112 as input to perform various application functions. In a particular embodiment, the second memory area 132 and the nth memory area 142 do not require any particular prearranged data structures. Accordingly, the second memory area 132 and the nth memory area 142 are illustrated as including memory addresses 136 and memory addresses 146, respectively.

In operation, the first processing core 110 may receive or generate new data. To store or communicate the new data, the first processing core 110 may access the last written buffer 113 to identify the last written memory address of the first memory area 112. As previously noted, the first processing core 110 may have sole write access among the other processing cores and partitions to the first memory area 112. The first processing core 110 may select a memory address to which to write the new data based on the last written buffer 113. For example, the last written buffer 113 may include a last written buffer value that corresponds to the last memory address to which data was written. To illustrate, the memory addresses 114-117 of the first memory area 112 may be numbered sequentially, such that a value of 0 indicates no address, a value of 1 indicates the first address 114, a value of 2 indicates the second address 115, a value of 3 indicates the third address 116, and a value of 4 indicates the fourth address 117. The last written buffer 113 may include a numerical value corresponding to the last memory address to which data was written. Thus, by accessing the last written buffer 113, the numerical value associated with a particular memory address 114-117 may be retrieved and a next memory address to which the new data is to written can be calculated. For example, the next memory address may be calculated as: next buffer=(last written buffer modulo 4)+1, where "next buffer" refers to a numerical value corresponding to one of the memory addresses 114-117 of the first memory area 112 and modulo 4 refers to a modulo operation in which a remainder of division of the value in the last written buffer 113 by 4 is calculated.

As explained above, the value 0 may be stored in the last written buffer 113 to indicate that no data has been stored in the first memory area 112. Accordingly, the value of the next buffer is 1, which corresponds to the first address 114. To further illustrate, when the last written memory address is the first address 114, the value in the last written buffer 113 is 1. Thus, the next buffer is calculated as 2, which corresponds to the second address 115. To further illustrate, the value stored in the last written buffer 113 is 4 when the last memory address to which data is written is the fourth address 117. The modulo 4 of 4 is 0; thus, the next buffer is 1, which corresponds to the first memory address 114. Thus, the first memory area 112 may be arranged to select the memory addresses 114-117 in a rotating manner. That is, the next memory address after the fourth memory address 117 is the first memory address 114. The number of memory addresses in the first memory area may be predetermined or configured based on the particular application.

Thus, the first processing core 110 may select a next memory address based on the last written buffer 113 and may write the new data to the next memory address. The first processing core 110 may then update the last written buffer 113 with a value corresponding to the address to which the new data was written. To illustrate, when the value of the last written buffer is 0, the next memory address is the first address 114. Accordingly, the new data is written to the first memory address 114 and the last written buffer 113 is updated to identify the first memory address 114 as the last written memory address (i.e. "1").

When another processing core identifies a need for the new data, the other processing core may access the last written buffer 113 to identify a memory address with the most recent data, i.e., the new data. For example, when the first partition 130 identifies a need for the new data, the first partition 130 may access the last written buffer 113 of the first memory area 112 and may read the value of the last written buffer 113 to determine the memory address to which the new data was written (in the example above, the first memory address 114). The first partition 130 may then read the new data from the first memory address 114. For example, the first partition 130 may copy the new data from the first memory address 114 to the memory address 136 of the second memory area 132. By copying the new data from the first memory area 112 to the second memory area 132, the first partition 130 may free up the first memory area 112 for access by other partitions, such as the nth partition 140. Accordingly, multiple partitions may read the new data stored in the first address 114 without interfering with one another while waiting for access to the new data. Thus, the first processing core 110 and the second processing core 120 may operate asynchronously and independently of one another. Likewise, the first partition 130 and the nth partition 140 may operate asynchronously and independently of one another.

The system of FIG. 1 supports non-locking sampling port messaging using shared memory (e.g., the shared memory 150) between multiple processors or processing cores (e.g., the processing cores 110, 120 or the partitions 130, 140). For example, when the first partition 130 determines that sampling port data is needed, the first partition 130 can read the most updated sampling port data received by the first processing core 110 by accessing the first memory area 112 without communicating directly with the first processing core 110. Likewise, when the first processing core 110 receives updated data, the first processing core 110 can communicate the most recently updated data to the second processing core 120 by storing the updated data in the first memory area 112 for access by the partitions 130, 140 as needed. Accordingly, no interrupts or other interaction directly between the first processing core 110 and the second processing core 120 is needed.

Figure 2:
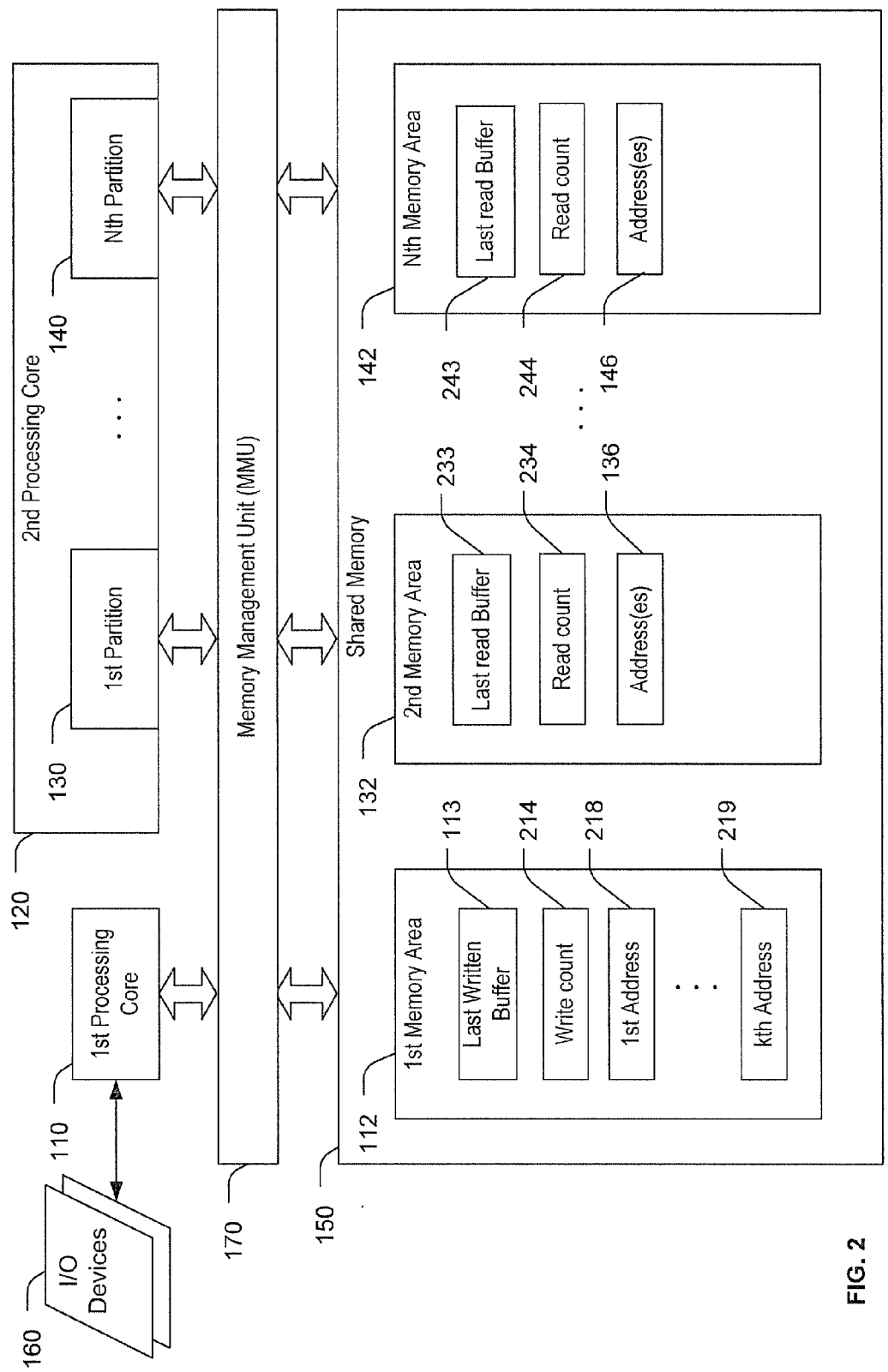
FIG. 2 is a block diagram of a second particular embodiment of a system that supports communication using shared memory.

FIG. 2 is a block diagram of a second particular embodiment of a system that supports communication using the shared memory 150. The system illustrated in FIG. 2 includes the elements of FIG. 1 and additional elements to support a queuing port mode. For example, in the system of FIG. 2, the first memory area 112 includes a write count 214. The write count 214 may include a numerical value indicating a number of times that data has been written to any memory address of the first memory area 112. The first memory area 112 may also include a sufficient number of memory addresses, such as a first memory address 218 and a kth memory address 219, to maintain a queue of queuing data messages. The number of memory addresses in the first memory area 112 may be selected based upon a read speed of processing cores that are reading queuing data messages from the first memory address 218.

The memory areas 132 and 142 associated with the other processing cores, e.g., the second processing core 120, may also include a data structure to support queuing port messaging. For example, the second memory area 132 and the nth memory area 142 may each include a last read buffer 233, 243. The last read buffer 233, 243 may include a value corresponding to a last memory address of the first memory area 112 that was read by the particular partition or processing core. To illustrate, the last read buffer 233 of the second memory area 132 may include a number corresponding to the last memory address that was read by the first partition 130 from the first memory area 112. Likewise, the last read buffer 243 of the nth memory area 142 may include a number corresponding to the last memory address that was read by the nth partition 140 from the first memory area 112.

The memory areas 132 and 142 associated with the other processing cores, e.g., the second processing core 120, may also include a read count 234, 244. The read count 234, 244 may include a value indicating how many times any memory address of the first memory area 112 has been read by the particular processing core or partition. To illustrate, the read count 234 of the second memory area 132 may indicate a number of times that the first partition 130 has read data from the first memory area 112. Likewise, the read count 244 of the nth memory area 142 may indicate a number of times that the nth partition 140 has read data from the first memory area 112.

In operation, the system illustrated in FIG. 2 may enable queuing port messaging between the processing cores 110 and 120. For example, the first processing core 110 may receive or generate new data. To store or communicate the new data, the first processing core 110 may access the last written buffer 113 to identify the last written memory address of the first memory area 112. As previously noted, the first processing core 110 may have sole write access among the other processing cores and partitions to the first memory area 112. The first processing core 110 may select a memory address to which to write the new data based on the last written buffer 113. For example, the last written buffer 113 may include a last written buffer value that indicates the last memory address to which data was written. For example, the next memory address may be calculated as: next buffer=(last written buffer modulo n)+1, where "next buffer" refers to a numerical value corresponding to one of the memory addresses 218-219 of the first memory area 112 and modulo n refers to a modulo operation in which a remainder of division of the value in the last written buffer 113 by a value of the number of memory addresses 218-219 in the first memory area 112 is calculated.

Thus, the first processing core 110 may select a next memory address based on the last written buffer 113 and may write the new data to the next memory address. The first processing core 110 may then update the last written buffer 113 with a value to identify the address to which the new data was written (e.g., last written buffer=next buffer). To illustrate, when the value of the last written buffer is 0, the next memory address is the first address 214 which corresponds to a last written buffer value of 1. The first processing core 110 may also update the write count 214 (e.g., increment the write count 214 by one).

Another particular processing core may determine whether there is additional queuing data to read by comparing the particular processing core's read count to the write count 214. For example, the first partition 130 may access the read count 234 of the second memory area 132 and compare the value of the read count 234 to the write count 214 of the first memory area 112. When the value of the read count 234 is equal to the value of the write count 214, the first partition 130 has read data from the first memory area 112 as many times as the first processing core 110 has written data to the first memory area 112. Accordingly, there is no additional data to be read. However, when the read count 234 is lower than the write count 214, the first partition 130 has read data from the first memory area 112 fewer times than the first processing core 110 has written data to the first memory area 112. Accordingly, data is queued in the first memory area 112 that the first partition 130 has not read. Thus, the first partition 130 may read data from the first memory area 112.

To read the data, the first partition 130 may access the last read buffer 233 to retrieve a value that identifies a memory address from which the first partition 130 most recently read data. Using the value from the last read buffer 233, the first partition 130 may calculate a next memory address to read. For example, the first partition 130 may calculate the next memory address as: next buffer address=base writer address+ (next read count−1)*size of data buffers)+size of write count buffer [e.g., about 4 bytes]+size of last written buffer [e.g., about 4 bytes]. The base writer address refers to a starting memory location of the first memory area 112. To illustrate, when the first memory area 112 starts at a memory address 10000 of the shared memory 150, the base writer address is 10000. Subsequent memory addresses of the first memory area 112 may be calculated based off the base writer address. The size of the data buffers refers to a size of each of the memory addresses 218-219.

The first partition 130 may read the data from the next read memory address. For example, the first partition 130 may copy the data from the next read memory address to the memory address 136 of the second memory area 132. After reading the data, the first partition may update the read count 234 (e.g., read count=read count+1).

The nth partition 140 may also maintain a read count 244 indicating a number of queuing data messages that the nth partition 140 has read from the first memory area and a last read buffer 243 indicating a last memory address read by the nth partition 140. Thus, the first partition 130 and the nth partition 140 may each independently read queuing data messages from the first memory area 112. The first partition 130 and the nth partition 140 may read at different rates (though the rates should be similar) and may have different read counts 234, 244 and different last read buffers 233, 243. The first memory area 112 may be sized to accommodate the read rates of the partitions 130, 140 that access the queuing data. Accordingly, queued port messaging may be accommodated in shared memory 150 by the system illustrated in FIG. 2.

Thus, the system of FIG. 2 support non-locking queuing port messaging using shared memory (e.g., the shared memory 150) between multiple processors or processing cores (e.g., the processing cores 110, 120 or the partitions 130, 140). For example, when the first partition 130 determines that new queuing port data is available (e.g., by comparing the write count 214 and the read count 234), the first partition 130 can read the queuing port data by accessing the first memory area 112 without communicating directly with the first processing core 110. Likewise, when the first processing core 110 receives updated data, the first processing core 110 can communicate the updated data to the second processing core 120 by storing the updated data in the first memory area 112 for access by the partitions 130, 140 as needed. Accordingly, no interrupts or other interaction directly between the first processing core 110 and the second processing core 120 are needed.

Figure 3:
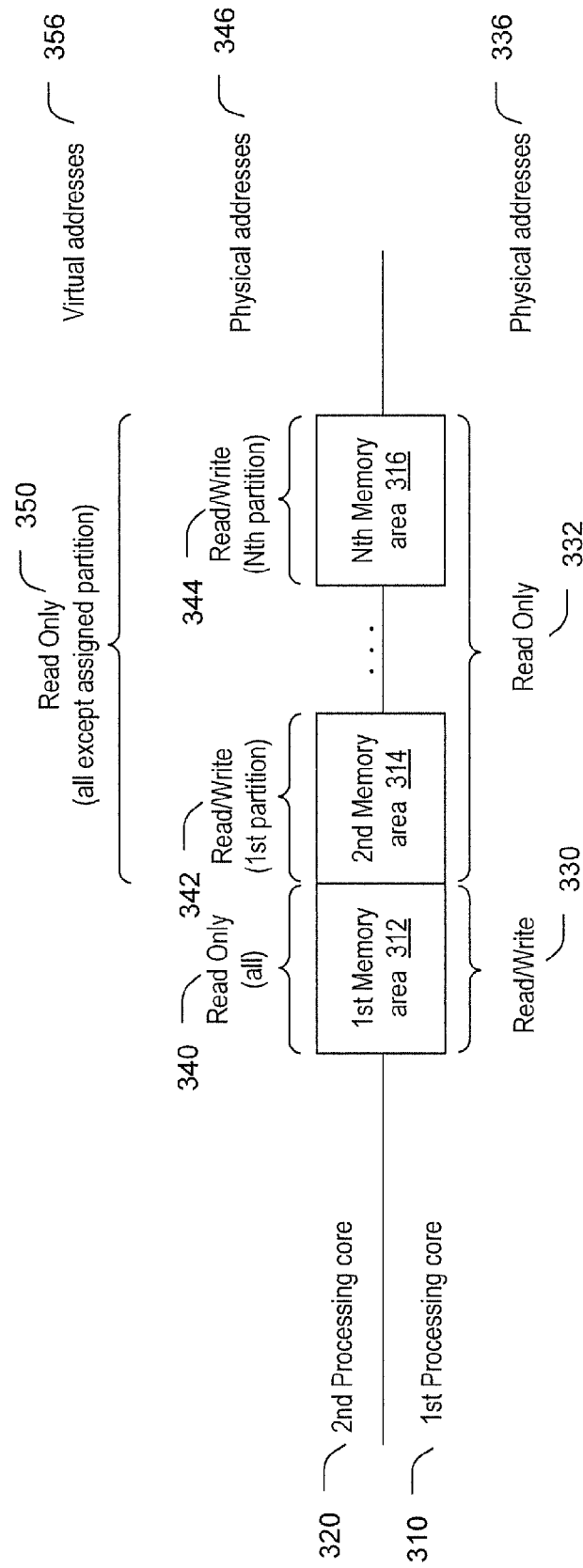
FIG. 3 is a diagram illustrating a particular embodiment of controlling access to a shared memory by multiple processors.

FIG. 3 is a diagram illustrating a particular embodiment of controlling access to a shared memory by multiple processors. The diagram of FIG. 3 illustrates controlling access to a shared memory area by multiple processors. For example, a shared memory, such as the shared memory 150 of FIGS. 1 and 2, may be partitioned by using physical addresses, virtual addresses, or both, by a memory management unit, such as the memory management unit 170 of FIGS. 1 and 2. A first processing core 310 and a second processing core 320 may be provided different access rights to different areas of the shared memory.

The shared memory may be allocated by the memory management unit using one or more memory management tables. The first processing core 310 may be provided read and write access 330 to a first memory area 312 using physical addresses 336. Likewise, the first processing core 310 may be provided read only access 332 to the second memory area 314 and the nth memory area 316 using the physical addresses 336. The second processing core 320 may be provided read only access 340 to the first memory area 312 using physical addresses 346. The read only access 340 may also be assigned to any additional processing core (not shown) that requires access to the first memory area 312.

When a processing core includes multiple partitions, access rights may be assigned to the partitions using physical and virtual addresses. For example, a first partition of the second processing core 320 may be assigned read and write access 342 to the second memory area 314 and the nth memory area 316 using physical addresses 346. Likewise, an nth partition of the second processing core 320 may be assigned read and write access 344 to the second memory area 314 and the nth memory area 316 using physical addresses 346. To accommodate read only access of some partitions of the second processing core 320, virtual addresses 356 may be used. Thus, read only access 350 may be provided to the nth partition of the second processing core to the second memory area 314. Likewise, read only access 350 may be assigned using the virtual addresses 356 to the first partition of the second processing core 320 to the nth memory area 316.

Figure 4:
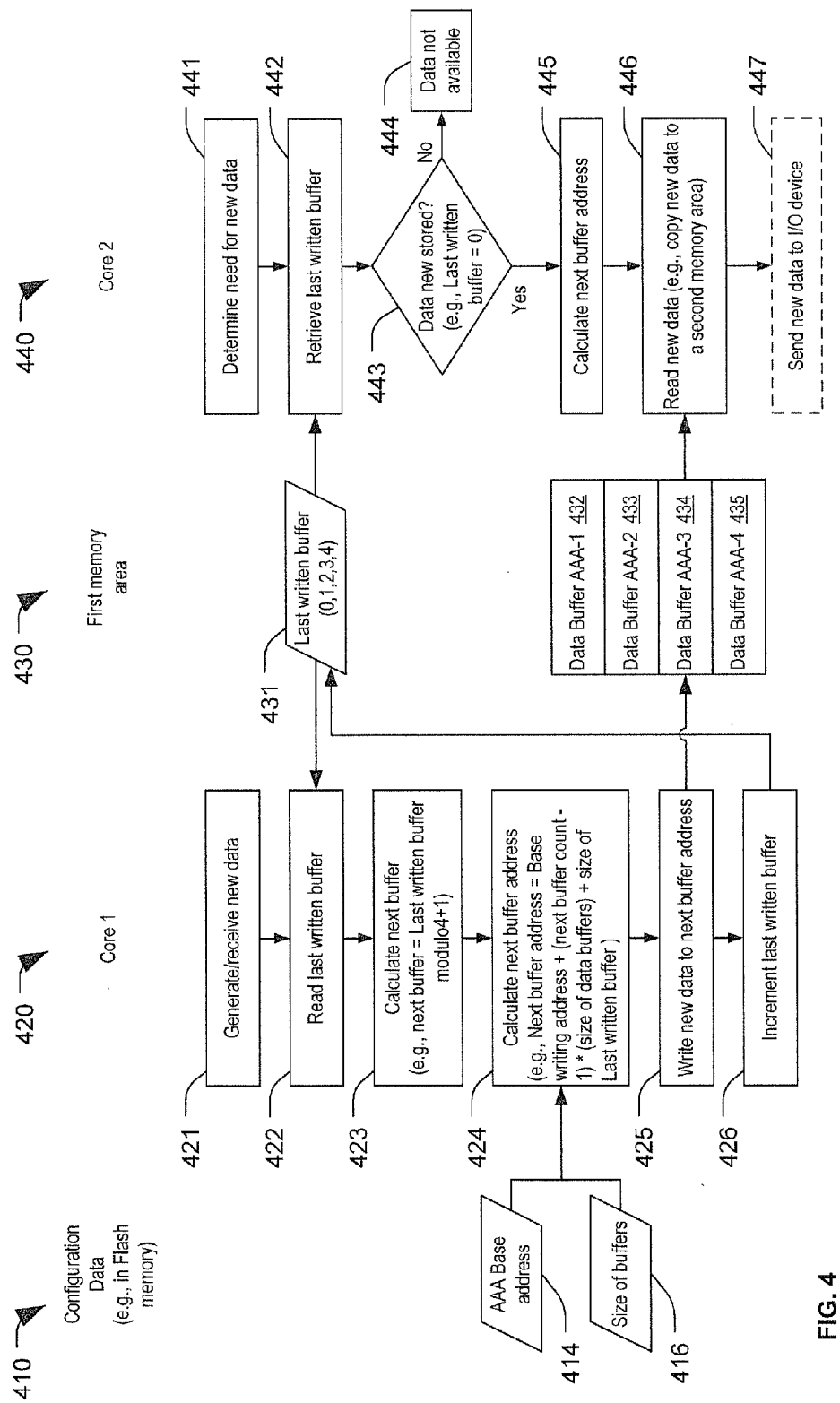
FIG. 4 is a data flow diagram of a first particular embodiment of a method of shared memory communications between processing cores.

FIG. 4 illustrates a data flow diagram of a first particular embodiment of a method of shared memory communications between processing cores. In particular, the method illustrated in FIG. 4 supports sampling port messaging between processing cores. FIG. 4 illustrates sampling data flow in a system that includes configuration data 410 (e.g., data stored in a flash memory to support the communications), a first processing core 420 associated with a first memory area 430 and a second processing core 440. Additionally, in some embodiments the second processing core 440 may be associated with a second memory area (not shown in FIG. 4).

In a particular embodiment, the first processing core 420 may generate or receive new data, at 421. To illustrate, the first processing core 420 may include an input/output processing core and the first processing core 420 may receive new data from an input device. In another example, the input/output processing core may receive output data of another processing core. In another example, the first processing core 420 may be an application processing core that generates new data as output.

At 422, the first processing core 420 may access a last written buffer 431. The last written buffer 431 may include a value corresponding to a location of a last buffer of the first memory area 430. The first processing core 420 may use the value in the last written buffer 431 to calculate a next buffer, at 423. For example, the first processing core 420 may calculate the next buffer using a modulo function on the value of the last written buffer 431. Using the modulo function may enable memory addresses of the first memory area 430 to be selected in a rotating manner. To illustrate, when the first memory area 430 includes four memory addresses (e.g., a first buffer 432, a second buffer, 433, a third buffer 434, and a fourth buffer 435) the last written buffer 431 may include a value of 0, 1, 2, 3, or 4. A value of 0 in the last written buffer 431 indicates that no data has been written to the first memory area 430. A value of 1 in the last written buffer 431 indicates that the last written buffer is the first buffer 432. A value of 2 in the last written buffer 431 indicates that the last written buffer is the second buffer 433. A value of 3 in the last written buffer 431 indicates that the last written buffer is the third buffer 434. A value of 4 in the last written buffer 431 indicates that the last written buffer is the fourth buffer 435. Thus, when a value of 0 is present in the last written buffer 431, the modulo 4 value is 0, which is incremented by 1 to calculate the next buffer. When the value in the last written buffer 431 is a 4, the modulo 4 value returns a 0 indicating that the next buffer is the first buffer 432.

After calculating the next buffer, the first processing core 420 may calculate a next buffer address, at 424. For example, the first processing core 420 may access configuration data 410 to determine a base address 414 and a size of buffers 416. The first processing core 420 may calculate the next buffer address by: next buffer address=base address+(next buffer−1)*size of buffers)+size of last written buffer. The first processing core 420 may write the new data to the next buffer address, at 425. For purposes of illustration, the next buffer address is illustrated in FIG. 4 as the third buffer 434. The first processing core 420 may increment the value in the last written buffer 431, at 426.

When the second processing core 440 determines a need for new data, at 441, the second processing core 440 may access, at 442, the last written buffer 431 to retrieve the value from the last written buffer. The second processing core 440 may evaluate the value from the last written buffer 431 to determine whether the new data has been stored, at 443. For example, the second processing core 440 may determine whether the value in the last written buffer 431 is equal to 0, indicating that no data has been written to the first memory area 430. When no new data has been stored, at 443, an indication that no data is available may be provided, at 444.

When new data has been stored, at 443, the second processing core 440 may calculate the next buffer address to be read, at 445. The second processing core 440 may calculate the next buffer address as: next buffer address=base address+(next buffer−1)*size of buffers)+size of last written buffer. After determining the next buffer address, the second processing core 440 may read the new data from the next buffer address, at 446. In a particular embodiment, the second processing core 440 may copy the new data to a second memory area (not shown) that is associated with the second processing core 440. When the second processing core 440 is an input/output processing core, the second processing core 440 may send the new data to an input/output device, at 447.

Figure 5:
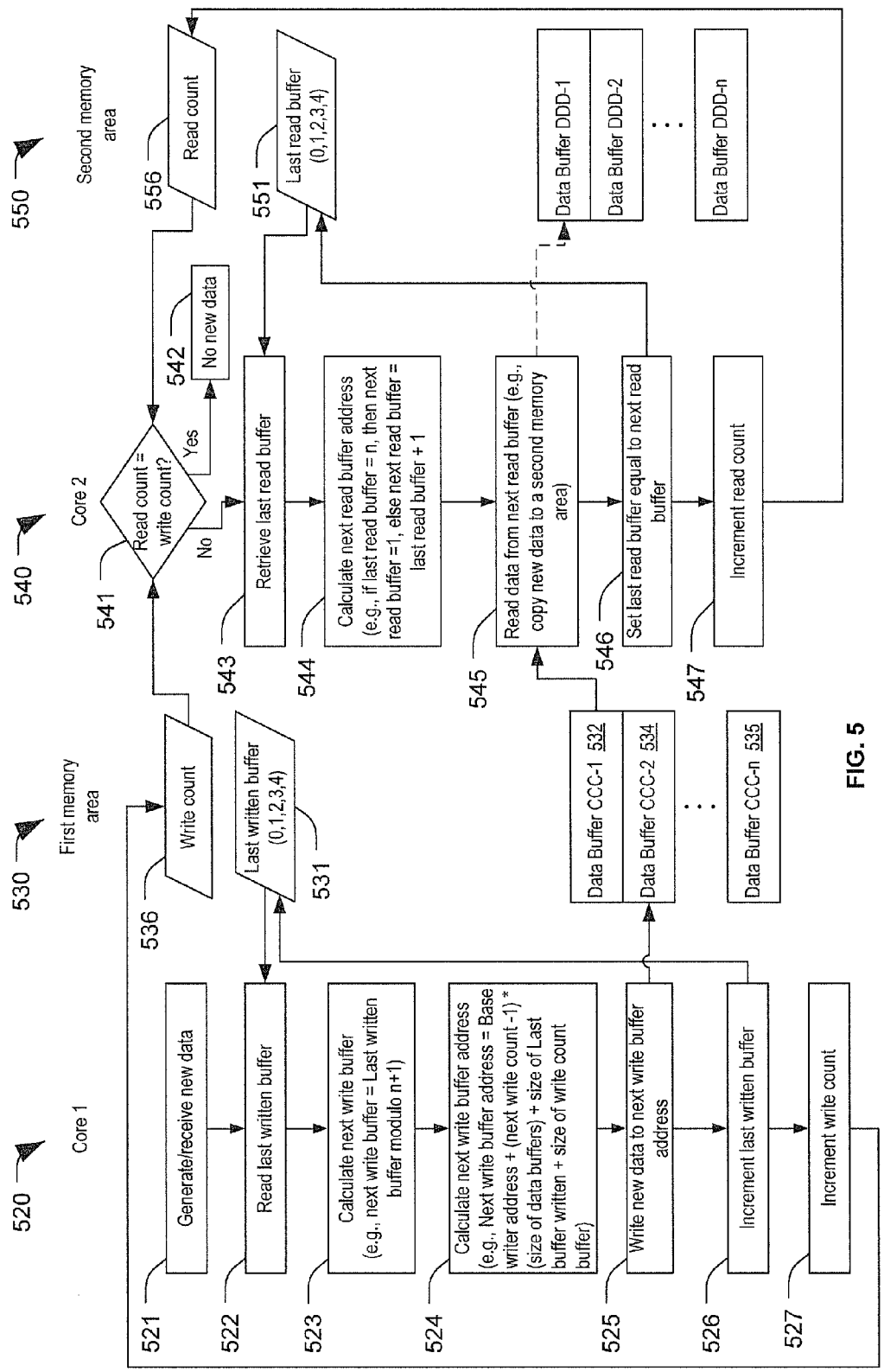
FIG. 5 is a data flow diagram of a second particular embodiment of a method of shared memory communications between processing cores.

FIG. 5 illustrates a data flow diagram of a second particular embodiment of a method of shared memory communications between processing cores. In particular, the method illustrated in FIG. 5 supports queuing port messaging between processing cores. FIG. 5 illustrates queuing port data flow in a system that includes configuration data (not shown), a first processing core 520 associated with a first memory area 530, and a second processing core 540 associated with a second memory area 550.

In a particular embodiment, the first processing core 520 may generate or receive new data, at 521. For example, the first processing core 520 may generate or receive data as described with reference to the first processing core 420 of FIG. 4. At 522, the first processing core 520 may access a last written buffer 531. The last written buffer 531 may include a value corresponding to a location of a last written buffer of the first memory area 530. The first processing core 520 may use the value in the last written buffer 531 to calculate a next write buffer, at 523. For example, the first processing core 520 may calculate the next write buffer in the same manner that the first processing core 420 of FIG. 4 calculates the next buffer.

After calculating the next write buffer, the first processing core 520 may calculate a next write buffer address, at 524. For example, the first processing core 520 may access configuration data to determine a base address and a size of buffers. The first processing core 520 may calculate the next write buffer address as: next write buffer address=base writer address+(next write count−1)*size of data buffers)+size of last written buffer+size of write count buffer. The first processing core 520 may write the new data to the next buffer address, at 525. For purposes of illustration, the next buffer address is illustrated in FIG. 5 as the second buffer 534. The first processing core 520 may increment the value in the last written buffer 531, at 526. Additionally, the first processing core 520 may increment the write count 536, at 527.

After the new data has been written, the second processing core 540 may read the data. The second processing core 540 may first determine, at 541, whether all queued data in the first memory area 530 has already been read. For example, the second processing core 540 may store a read count 556 in the second memory area 550. The second processing core 540 may access the read count 556 and access the write count 536. When the read count 556 is equal to the write count 536, no new data has been written to the queue, at 542.

When the read count is not equal to the write count, the second processing core 540 may, at 543, access a last read buffer 551. The last read buffer 551 may include a value that corresponds to a last buffer address read from the first memory area 530 by the second processing core 540. The second processing core 540 may use the value of the last read buffer 551 to calculate a next read buffer address, at 544. For example, when the last read buffer has a value n that corresponds to an nth buffer 535 of the first memory area 530, the next read buffer is equal to a value that corresponds to the first buffer address 532 of the first memory area 530. Otherwise, the next read buffer is equal to the last read buffer plus 1.

The second processing core 540 may read the data from the next read buffer, at 545. Note that the next read buffer may not be equal to the last written buffer 531 of the first processing core 520. For example, the second processing core 540 may read data from the first memory area 530 at a rate that is slower than the data is written to the first memory area 530 by the first processing core 520. However, the read and write rates may be sufficiently close that the first processing core 520 does not overwrite data in the queue until it is read by the second processing core 540 (and any other processing core that reads the queued data).

In a particular embodiment, the second processing core 540 may copy the new data from the next buffer address to a buffer of the second memory area 550. After reading the data from the next read buffer, the second processing core 540 may set the last read buffer equal to the next read buffer, at 546. That is, the last read buffer may be set to a value of the last buffer address read. The second processing core 540 may also increment the read count 556, at 547. After incrementing the read count 556, the second processing core 540 may determine whether additional data is to be read from the queue in the first memory area 530 by comparing the read count 556 to the updated write count 536 of the first memory area 530.

Figure 6:
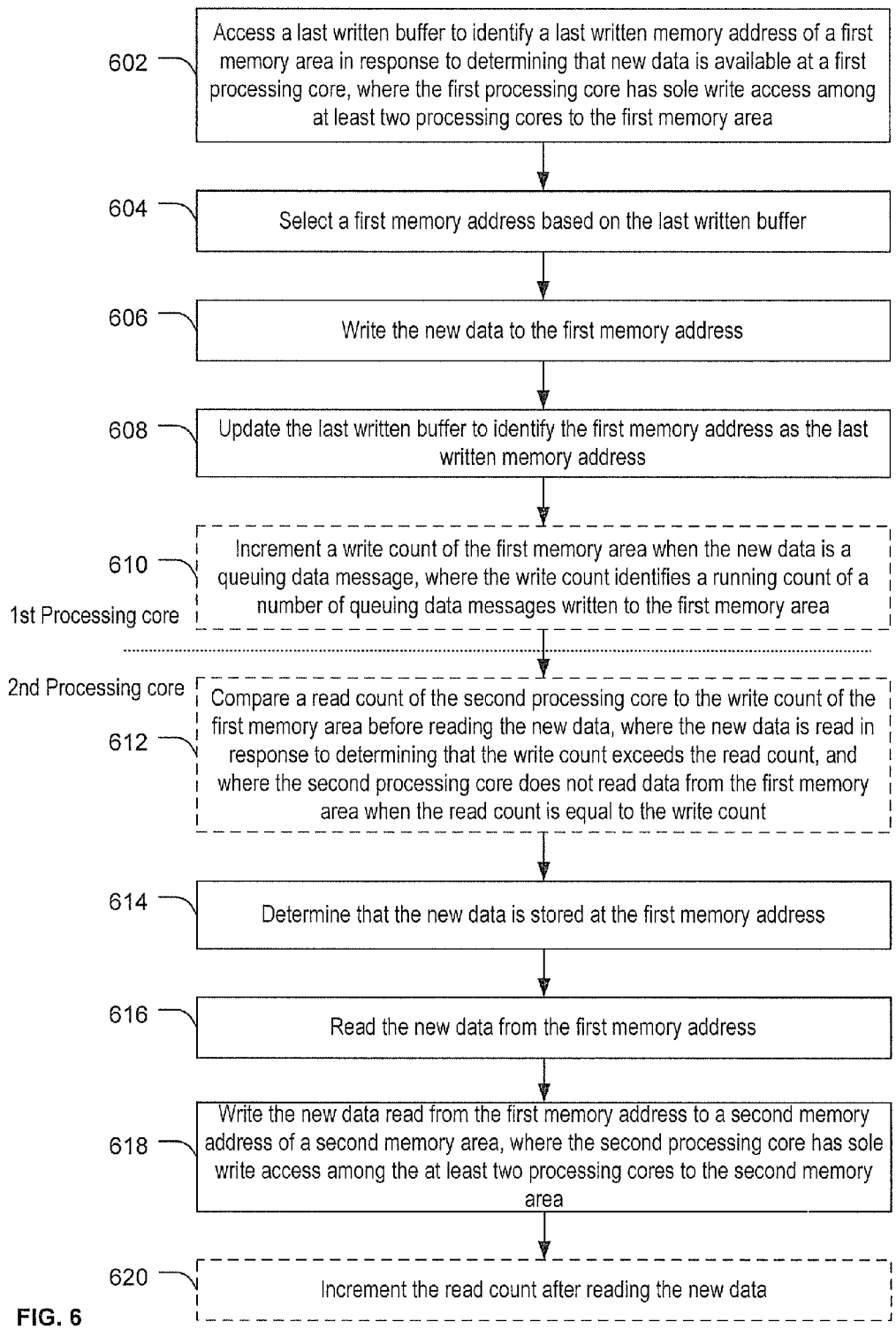
FIG. 6 is a flow chart of a third particular embodiment of a method of shared memory communications between processing cores.

FIG. 6 is a flow chart of a third particular embodiment of a method of shared memory communications between processing cores. The method illustrated in FIG. 6 includes operations performed by a first processing core to write data to the shared memory and operations performed by a second processing core to read or copy the data. Different operations may be performed depending on whether data that is communicated between the processing cores is sampling port data or queuing port data. In FIG. 6, operations that are performed for queuing port data are shown in broken line boxes.

The method may include, at 602, the first processing core accessing a last written buffer to identify a last written memory address of a first memory area in response to determining that new data is available at a first processing core. The first processing core has sole write access among at least two processing cores to the first memory area. The first processing core may select a first memory address based on the last written buffer, at 604. The first processing core may write the new data to the first memory address, at 606. The first processing core may update the last written buffer to identify the first memory address as the last written memory address, at 608. The first processing core may increment a write count of the first memory area when the new data is a queuing port data, e.g., a queuing data message, at 610. The write count identifies a running count of a number of queuing data messages written to the first memory area.

When the new data is queuing port data, the second processing core may compare a read count of the second processing core to the write count of the first memory area, at 612. The new data may be read in response to determining that the write count exceeds the read count. Conversely, the second processing core does not read data from the first memory area when the read count is equal to the write count.

The second processing core may determine that the new data is stored at the first memory address, at 614. The second processing core may read the new data from the first memory address, at 616. To read the data when the new data is queuing port data, the second processing core may determine which memory address of the first memory area to read (e.g., the first memory address that is storing the new data) based on a last read buffer address associated with the second processing core. When the new data is sampling port data, the second processing core may determine which memory address of the first memory area to read based on a last written memory address of the first memory area.

In a particular embodiment, the second processing core may write the new data read from the first memory address to a second memory address of a second memory area, at 618. The second processing core may have sole write access among the at least two processing cores to the second memory area. When the new data is queuing port data, the second processor may increment the read count after reading the new data, at 620.

Figure 7:
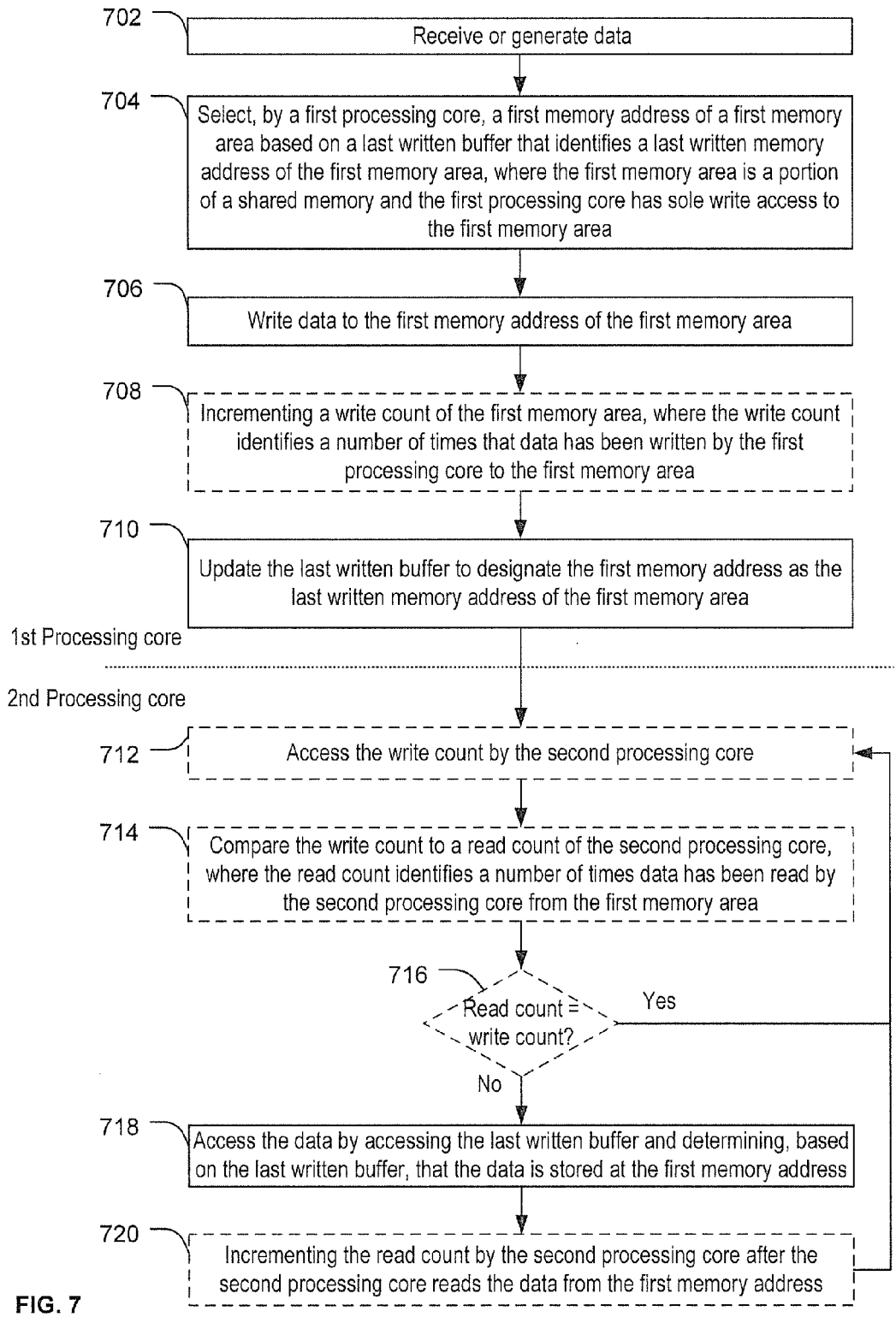
FIG. 7 is a flow chart of a fourth particular embodiment of a method of shared memory communications between processing cores.

FIG. 7 is a flow chart of a fourth particular embodiment of a method of shared memory communications between processing cores. The method illustrated in FIG. 7 includes operations performed by a first processing core to write data to the shared memory and operations performed by a second processing core to read or copy the data. Different operations may be performed depending on whether data that is communicated between the processing cores is sampling port data or queuing port data. In FIG. 7, operations that are performed for queuing port data are shown in broken line boxes.

The method may include, at 702, the first processing core receiving or generating data. The first processing core may also select a first memory address of a first memory area based on a last written buffer that identifies a last written memory address of the first memory area, at 704. The first memory area is a portion of a shared memory and the first processing core has sole write access to the first memory area. The first processing core may write data to the first memory address of the first memory area, at 706. When the data is queuing port data, the first processing core may increment a write count of the first memory area, at 708. The write count identifies a number of times that data has been written by the first processing core to the first memory area. The first processing core may also update the last written buffer to designate the first memory address as the last written memory address of the first memory area, at 710.

When the data is queuing port data, the second processing core may access the write count, at 712. The second processing core may also compare the write count to a read count of the second processing core, at 714. The read count identifies a number of times data has been read by the second processing core from the first memory area. When the read count is equal to the write count, at 716, there is no new data that the second processing core has not read. Accordingly, the second processing core may return to 712 to access the write count. When the read count is not equal to the write count, at 716, new data has been written at the first memory area that the second processing core has not read. When the data is queuing port data, the second processing core may access the data by accessing a last read buffer associated with the second processing core and determining, based on the last read buffer, a memory address of the first memory to read. When the data is sampling port data, the second processing core may access the data by accessing the last written buffer and determining, based on the last written buffer, that the data is stored at the first memory address, at 718. When the data is queuing port data, the second processing core may increment the read count after the second processing core reads the data from the first memory address, at 720.

Figure 8:
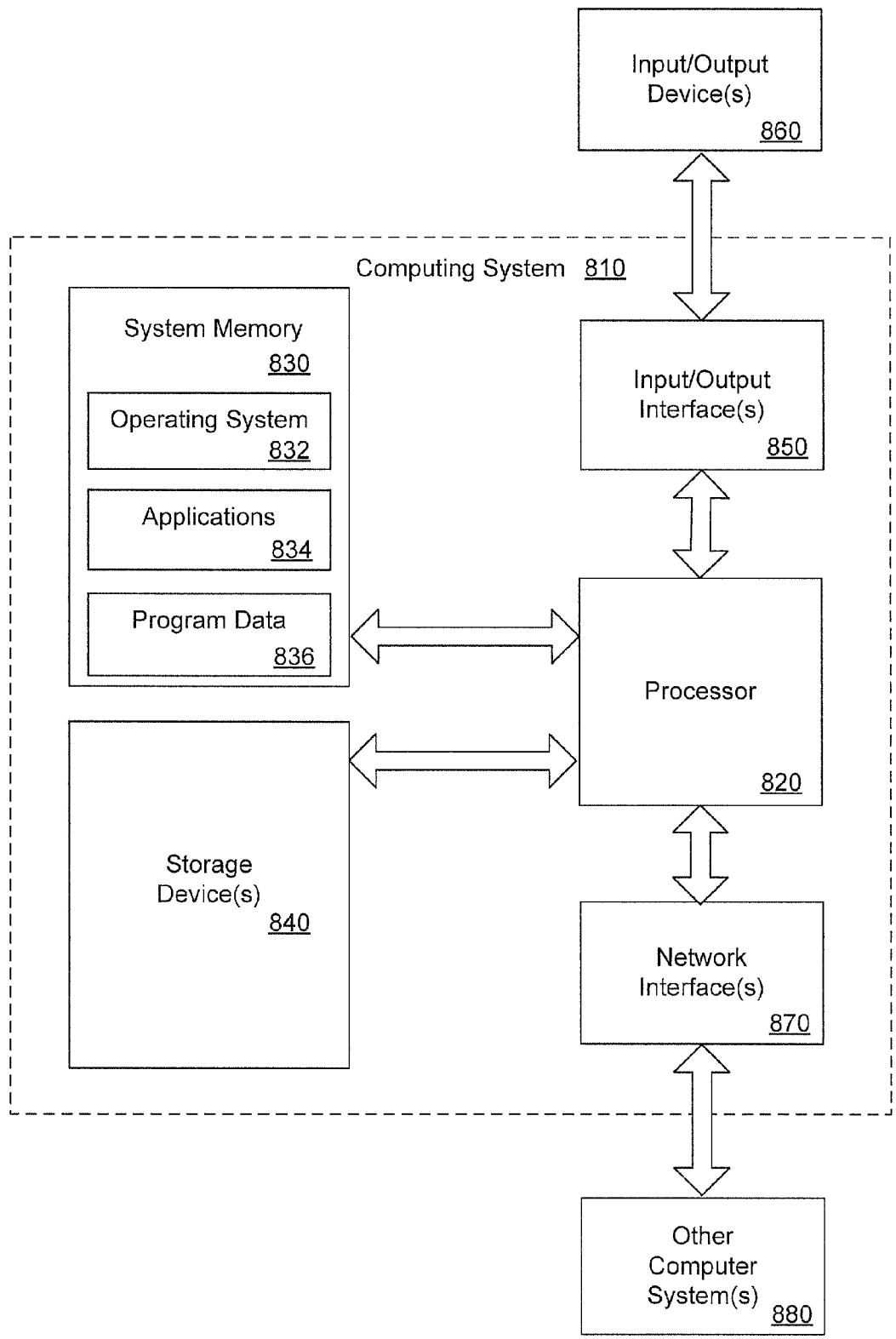
FIG. 8 is a block diagram illustrating a particular embodiment of a computer system that may implement one or more of the disclosed methods.

FIG. 8 is a block diagram illustrating a particular embodiment of a computer system that may implement one or more of the disclosed methods of communication using shared memory. In a particular embodiment, one or more of the methods of communication using shared memory disclosed, or portions thereof, may be implemented using processor-readable instructions executable by one or more processors. For example, a computing system 810 may include one or more of the processing cores, shared memory or memory management units described with reference to FIGS. 1-5. The computing system 810 may also be implemented as or incorporated into various other devices, such as a personal computer (PC), a tablet PC, a mobile device, a communications device, a control system, an avionics system, or any other machine capable of executing a set of instructions (sequential or otherwise) that specify actions to be taken by that machine. Further, while the computing system 810 is illustrated as a single computer, the term "system" includes any collection of systems or sub-systems that individually or jointly execute a set, or multiple sets, of instructions to perform one or more computer functions. While FIG. 8 illustrates one embodiment of the particular computing system 810, other computer systems or computing architectures and configurations may be used for carrying out the methods of communication using shared storage described herein.

The computing system 810 includes at least one processor 820. The processor 820 may include a single-chip processor (with one or more processing cores or logical partitions) or multiple processors. In a particular embodiment, the processor 820 is a programmable digital processor that controls operation of the computing system 810. For example, using instructions retrieved from a system memory 830, the processor 820 controls the reception and manipulation of input data and the generation of output data (e.g., to a display or other output device).

The processor 820 may be coupled to the system memory 830. The system memory 830 may include any suitable non-transitory, computer-readable storage media depending on, for example, whether data access needs to be bi-directional or uni-directional, speed of data access desired, memory capacity desired, other factors related to data access, or any combination thereof. The system memory 830 may include various memory devices, such as registers, caches, volatile memory, and non-volatile memory. The system memory 830 can include operating instructions such as an operating system 832, one or more applications 834, and program data 836 used by the processor 820 to perform functions of the computing system 810.

The computing system 810 may also include storage devices 840 to provide additional data storage capacity. The storage devices 840 may be coupled either bi-directionally or uni-directionally to processor 820. In various embodiments, the storage devices 840 may include non-transitory, computer-readable storage media such as magnetic tape, flash memory, PC-CARDS, portable mass storage devices, optical or holographic storage devices, magnetic or electromagnetic storage devices, and read-only or random access memory devices. Like the system memory 830, the storage devices 840 may include operating instructions (e.g., program code), data, or both.

The processor 820 may be coupled to an input/output interface 850 to enable the computing system 810 to receive input and to provide output to input/output devices 860. Examples of output devices may include display devices, speakers, printers, or other devices that provide an output in a manner that is perceptible by a user (e.g., haptic devices). Examples of input devices may include keyboards, pointing devices, biometric devices, microphones, sensors, or other devices to sense or receive user input or other input. The processor 820 may also be coupled to a network interface 870 (such as a wireless network interface, a modem, an Ethernet interface, or another device to output or receive data from another computer system or other machine). The network interface 870 may enable data communications between the computing system 810 and other computer systems 880. In a particular embodiment, the other computer systems 880 communicate with the computing system 810 via a shared memory, such as the system memory 830, the storage devices 840, or another memory device (not shown).

In a particular embodiment, dedicated hardware may be used to implement at least a portion of the methods of communication using shared memory disclosed herein. For example, application specific integrated circuits, programmable logic arrays or other hardware devices may be used to implement one or more of the methods, or portions of the methods, disclosed herein.

The disclosed systems and methods support non-locking messaging between multiple processors or processing cores using shared memory. The messaging may include sampling port messaging or queuing port messaging. Additionally, the systems and methods enable robust partitioning between the processing cores, with no interrupts or other interaction directly between the processing cores.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A system, comprising:
a first processing core;
a second processing core, wherein the second processing core is configured to execute a first partition;
a shared memory accessible to the first processing core and to the second processing core, wherein the shared memory includes a first memory area that can be read and written to by the first processing core, wherein the first memory area can be read by the second processing core and cannot be written to by the second processing core, wherein the shared memory includes a second memory area that can be read and written to by the first partition, and wherein the second memory area can be read by the first processing core and cannot be written to by the first processing core; and
a computer-readable storage medium accessible to the first processing core and to the second processing core, wherein the computer-readable medium includes instructions, wherein the instructions are executable by the first processing core to cause the first processing core to:
access a last sampling written buffer in the first memory area to identify a last sampling written memory address of the first memory area in response to determining that sampling data is available at the first processing core, wherein the last sampling written buffer stores a value corresponding to the last sampling written memory address;
determine a first memory address based on the value;
write the sampling data to a memory location identified by the first memory address;
update the last sampling written buffer to indicate a second value corresponding to the first memory address, and
wherein the instructions are executable by the second processing core to cause the second processing core while executing the first partition to:
access the last sampling written buffer of the first memory area;
determine, based on the second value, that the sampling data is stored at the memory location identified by the first memory address;
read the sampling data from the memory location identified by the first memory address, wherein the sampling data is read by the first partition without updating a first read counter stored in the second memory area; and
write the sampling data to the second memory area; and
wherein the second processing core is further configured to execute a second partition, wherein the shared memory further includes a third memory area that can be read and written to by the second partition, wherein the third memory area can be read by the first processing core and the first partition and cannot be written to by the first processing core and cannot be written to by the first partition, wherein the second partition can read the first memory area and the second memory area and cannot write to the first memory area and cannot write to the second memory area, and wherein the instructions are executable by the second processing core to cause the second processing core while executing the second partition to:

access the last sampling written buffer of the first memory area;
determine, based on the second value, that the sampling data is stored at the memory location identified by the first memory address;
read the sampling data from the memory location identified by the first memory address, wherein the sampling data is read by the second partition without updating a second read counter stored in the third memory area; and
write the sampling data to the third memory area.

2. The system of claim 1, wherein the instructions are further executable by the first processing core to cause the first processing core to:
access a last queuing written buffer in the first memory area to identify a last queuing written memory address of the first memory area in response to determining that queuing data is available at the first processing core, wherein the last queuing written buffer stores a third value corresponding to the last queuing written memory address;
determine a second memory address based on the third value;
write the queuing data to a second memory location identified by the second memory address;
update the last queuing written buffer to indicate a fourth value corresponding to the second memory address; and
update a write counter stored in the first memory area.

3. The system of claim 2, wherein the instructions are further executable by the second processing core to cause the second processing core while executing the first partition to:
access the last queuing written buffer of the first memory area;
determine, based on the fourth value, that the queuing data is stored at the second memory location identified by the second memory address;
compare the write counter to the first read counter to determine whether new queuing data is available;
in response to determining that new queuing data is available, read the queuing data from the memory location identified by the second memory address;
in response to reading the queuing data, update the first read counter; and
write the queuing data to the second memory area.

4. The system of claim 3, wherein the instructions are executable by the second processing core to cause the second processing core while executing the second partition to:
access the last queuing written buffer of the first memory area;
determine, based on the fourth value, that the queuing data is stored at the second memory location identified by the second memory address;
compare the write counter to the second read counter to determine whether new queuing data is available;
in response to determining that new queuing data is available, read the queuing data from the memory location identified by the second memory address;
in response to reading the queuing data, updating the second read counter; and
write the queuing data to the third memory area.

5. The system of claim 1, wherein the instructions are further executable by the first processing core to cause the first processing core to:
access a last queuing written buffer in the first memory area to identify a last queuing written memory address of the first memory area in response to determining that queuing data is available at the first processing core, wherein the last queuing written buffer stores a third value corresponding to the last queuing written memory address;
determine a second memory address based on the third value;
write the queuing data to a second memory location identified by the second memory address;
update the last queuing written buffer to indicate a fourth value corresponding to the second memory address; and
update a write counter stored in the first memory area, and
wherein the instructions are executable by the second processing core to cause the second processing core while executing the first partition to:
access the last queuing written buffer of the first memory area;
determine, based on the fourth value, that the queuing data is stored at the second memory location identified by the second memory address;
compare the write counter to the first read counter to determine whether new queuing data is available;
in response to determining that new queuing data is available, read the queuing data from the memory location identified by the second memory address;
in response to reading the queuing data, updating the first read counter; and
write the queuing data to the second memory area.

6. The system of claim 5, wherein when the first read counter is equal to the write counter, the first partition determines that no new queuing data is available.

7. The system of claim 1, wherein the first memory area includes a predetermined number of memory addresses that are selected in a rotating manner, wherein a particular value stored in the last sampling written buffer corresponds to a particular memory address of the memory addresses of the first memory area, and wherein the particular value is distinct from the particular memory address.

8. A computer-implemented method, comprising:
selecting, by a first processing core, a first memory address of a first memory area based on a last sampling written buffer that identifies a value corresponding to a last sampling written memory address of the first memory area, wherein the first memory area is a portion of a shared memory, wherein the first memory area can be read and written to by the first processing core, and wherein the first memory area can be read by a second processing core and cannot be written to by the second processing core;
writing, by the first processing core, sampling data to a memory location identified by the first memory address; and
after writing the sampling data, updating the last sampling written buffer to indicate a second value corresponding to the first memory address,
executing a first partition on the second processing core, wherein the second processing core, while executing the first partition, is operable to:
access the last sampling written buffer;
determine, based on the second value, that the sampling data is stored at the memory location identified by the first memory address;
read the sampling data from the memory location, wherein the sampling data is read by the first partition without updating a first read counter stored in a second memory area; and
write the sampling data to the second memory area, wherein the second memory area is a second portion of the shared memory, wherein the second memory area can be read and written to by the first partition, and wherein the second memory area can be read by the first processing core and cannot be written to by the first processing core, executing a second partition on the second processing core, wherein the second processing core, while executing the second partition, is operable to:

access the last sampling written buffer, determine, based on the second value, that the sampling data is stored at the memory location identified by the first memory address, read the sampling data from the memory location identified by the first memory address, wherein the sampling data is read by the second partition without updating a second read counter stored in a third memory area, and write the sampling data to the third memory area of the shared memory, that can be read and written to by the second partition, wherein the third memory area can be read by the first processing core and the first partition and cannot be written to by the first processing core and cannot be written to by the first partition, and wherein the second partition can read the first memory area and the second memory area and cannot write to the first memory area and cannot write to the second memory area.

9. The computer-implemented method of claim 8, wherein the first processing core is an input/output (I/O) processing core and the second processing core is an application processing core, and further comprising receiving the sampling data, by the I/O processing core, from an I/O device.

10. The computer-implemented method of claim 8, wherein the second processing core is an input/output (I/O) processing core and the first processing core is an application processing core that generates the sampling data as output, and further comprising sending the sampling data to an I/O device.

11. The computer-implemented method of claim 8, wherein the first processing core is a first application processing core assigned to perform a first set of functions that generate the sampling data as output and the second processing core is a second application processing core assigned to perform a second set of functions that use the sampling data as input.

12. The computer-implemented method of claim 8, further comprising:

writing, by the first processing core, queuing data to a second memory address of the first memory area; and incrementing a write counter of the first memory area after writing the queuing data to the second memory address, wherein the write counter identifies a first number of times that queuing data has been written by the first processing core to the first memory area.

13. The computer-implemented method of claim 12, further comprising:

accessing the write counter by the first partition; and comparing the write counter to the first read counter of the, wherein the first read counter identifies a second number of times queuing data has been read by the first partition from the first memory area, and wherein the queuing data is read from the second memory address when the write counter is greater than the first read counter.

14. The computer-implemented method of claim 13, further comprising incrementing the first read counter by the second processing core after the second processing core reads the queuing data from the first memory address.

15. The computer-implemented method of claim 14, further comprising continuing, by the second processing core, to read additional queuing data from the first memory area and to increment the first read counter until the first read count equals the write counter.

16. A system comprising:

a shared memory, wherein the shared memory includes a first memory area and a second memory area;

a memory management unit that controls read access and write access to the shared memory;

a first processing core, wherein the memory management unit allows the first processing core to read and write to the first memory area, wherein the memory management unit allows the first processing core to read the second memory area and does not allow the first processing core to write to the second memory area, and wherein, when sampling data is to be stored by the first processing core, the first processing core:

determines a first memory address of the first memory area based on a last written buffer that indicates a value corresponding to a last written memory address of the first memory area;

stores the sampling data at a memory location identified by the first memory address of the first memory area;

updates the last written buffer to indicate a second value corresponding to the first memory address;

accesses a last queuing written buffer in the first memory area to identify a last queuing written memory address of the first memory area in response to determining that queuing data is available, wherein the last queuing written buffer stores a third value corresponding to the last queuing written memory address;

determines a second memory address based on the third value;

writes the queuing data to a second memory location identified by the second memory address;

updates the last queuing written buffer to indicate a fourth value corresponding to the second memory address; and updates a write counter stored in the first memory area; and a second processing core configured to execute a first partition, wherein the memory management unit allows the first partition to read and write to the second memory area, wherein the memory management unit allows the first partition to read the first memory area and does not allow the first partition to write to the first memory area, and wherein the second processing core is operable while executing the first partition to:

access the last written buffer of the first memory area;

determine, based on the second value, that the sampling data is stored at the memory location identified by the first memory address;

read the sampling data from the memory location identified by the first memory address, wherein the sampling data is read by the second processing core without updating a first read counter stored in the second memory area;

write the sampling data to the second memory area;

access the last queuing written buffer of the first memory area;

determine, based on the fourth value, that the queuing data is stored at the second memory location identified by the second memory address;

compare the write counter to the first read counter to determine whether new queuing data is available;

in response to determining that new queuing data is available, read the queuing data from the memory location identified by the second memory address;

in response to reading the queuing data, updating the first read counter; and write the queuing data to the second memory area.

17. The system of claim 16, wherein all data that is passed between the first processing core and the second processing core is communicated via the shared memory without interrupts.

18. The system of claim 16, wherein the first processing core is an input/output (I/O) processing core and the second processing core is an application processing core, and wherein the I/O processing core is configured to receive the sampling data from an I/O device.

19. The system of claim 16, wherein the second processing core is an input/output (I/O) processing core and the first processing core is an application processing core that generates the sampling data as output, and wherein the I/O processing core is configured to send the sampling data to an I/O device.

20. The system of claim 16, wherein the shared memory further includes a third memory area, wherein the memory management unit allows the first partition to read the third memory area and does not allow the first partition to write to the third memory area, wherein the memory management unit allows the first processing core to read the third memory area and does not allow the first processing core to write to the third memory area, wherein the second processing core is further configured to execute a second partition, wherein the memory management unit allows the second partition to read and write to the third memory area, wherein the memory management unit allows the second partition to read the first memory area and does not allow the second partition to write to the first memory area, wherein the memory management unit allows the second partition to read the second memory area and does not allow the second processing core to write to the second memory area, and wherein the second processing core is operable while executing the second partition to:

access the last written buffer of the first memory area;

determine, based on the second value, that the sampling data is stored at the memory location identified by the first memory address;

read the sampling data from the memory location identified by the first memory address, wherein the sampling data is read by the second processing core without updating a second read counter stored in the third memory area; and write the sampling data to the third memory area.

\* \* \* \* \*